United States Patent [19]

Ackerman

[11] Patent Number: 5,527,473

[45] Date of Patent: Jun. 18, 1996

[54] PROCESS FOR PERFORMING REACTIONS IN A LIQUID-SOLID CATALYST SLURRY

[76] Inventor: Carl D. Ackerman, 1160 Woodhill Dr., Gibsonia, Pa. 15044

[21] Appl. No.: 369,898

[22] Filed: Jan. 9, 1995

Related U.S. Application Data

[63] Continuation-in-part of Ser. No. 91,284, Jul. 15, 1993, Pat. No. 5,387,340, and Ser. No. 164,262, Dec. 9, 1993, abandoned.

[51] Int. Cl.$^6$ .......................... B01D 19/00; B01D 57/00; C07C 1/04
[52] U.S. Cl. .......................... 210/767; 95/241; 208/950; 518/700; 518/728; 210/497.01
[58] Field of Search .......................... 210/497.01, 497.1, 210/498, 499, 749, 767, 805, 472, 808; 422/216, 218, 219, 311; 208/950; 518/700, 728; 585/901, 906, 921, 922; 95/241

[56] References Cited

U.S. PATENT DOCUMENTS

| | | | |
|---|---|---|---|
| 2,159,077 | 5/1939 | Duftschmid et al. | 518/700 |
| 2,161,974 | 6/1939 | Peck | 518/700 |
| 2,438,029 | 3/1948 | Atwell | 518/700 |
| 2,671,103 | 3/1954 | Kolbel et al. | 518/700 |
| 3,652,231 | 3/1972 | Greenwood et al. | 422/216 |
| 3,706,536 | 12/1972 | Greenwood et al. | 422/216 |
| 4,828,689 | 5/1989 | Lamort | 210/497.01 |
| 5,422,375 | 6/1995 | Rytier et al. | 518/700 |

OTHER PUBLICATIONS

"The Fischer–Tropsch Synthesis in the Liquid Phase", Catal. Rev.—Sci Eng., 21(2), pp. 225–274, Published 1980, Herbert Kolbel and Milos Ipalek.

Primary Examiner—Joseph W. Drodge
Attorney, Agent, or Firm—Paul Bogdon

[57] ABSTRACT

A process for performing reactions in a liquid-solid catalyst slurry where feed gases pass continuously upward through the slurry bed contained in a reactor vessel and operating at elevated temperature and pressure; convening the gases to liquid and vaporous products; withdrawing the liquid products through a shaped-wire filter element having precise slit openings in the range between 0.5 and 100 microns; and exiting from the bed and then from the top of the reactor vaporous products formed in the slurry and any unreacted gas. The filter element retains in the bed the solid catalyst particles larger than the slit width. The liquid is withdrawn to an accumulator external to the reactor vessel. The accumulator and the liquid chamber inside the filter element have unrestricted venting to the space above the expanded slurry bed. Liquid is withdrawn from the accumulator, while holding a suitable fixed level. The filter system neither plugs nor forms a cake during sustained operation.

18 Claims, 6 Drawing Sheets

PROCESS FOR PERFORMING REACTIONS IN A LIQUID-SOLID CATALYST SLURRY

RELATIONSHIP TO OTHER PATENT APPLICATIONS

This Patent Application is a continuation-in-part of U.S. patent application Ser. No. 08/091,284, filed Jul. 15, 1993, now U.S. Pat. No. 5,387,340, in the name of Carl D. Ackerman for Wires Filter Element and Method of Manufacture and a continuation-in-part of U.S. patent application Ser. No. 08/164,262, filed Dec. 9, 1993, now abandoned, in the name of Carl D. Ackerman for Wire Filter Element and Method of Manufacture and Process for the Treatment of Gases, Solids, and Liquids using the Wire Filter Element.

BACKGROUND OF THE INVENTION

The invention relates to a novel process for treatment of a combination of gases, finely divided solids, and liquids using a wire filter element with mechanically controlled filter slit of precise minute openings in the range of 0.5 to 100 microns. The process is used where reactions or other functions are carried out with finely divided solids in intimate contract with liquid or gases or both. The filter element will retain solids larger than the slit openings of the element. As an example of the application of the filter element with the process, the filter slit openings are 10 microns and the solid particle sizes are greater than 20 microns in the reactor vessel and only the liquid product is withdrawn through the filter slits while all the solid particles are retained in the vessel.

A number of established and developing chemical, petroleum refining and other continuous processes use finely-divided catalysts to promote reactions in vessels typically operated at elevated temperatures and pressures. Economics strongly favor the ability to use the catalyst for prolonged periods without shutting down the process or without losing or replacing the catalyst. Some of these processes retain the catalyst in the reactor, or control the loss to a small mount each day, by the use of cyclones, filters, electrostatic precipitators, scrubbers, or combinations of these and other techniques. Successful techniques have been proven for commercial use for gas-solid catalyst systems such as fluidized-bed catalytic cracking. No such technique has been developed for either of the analogous liquid-solid or the gas-liquid-solid systems.

An example of an unfulfilled need is the rapidly-increasing use of Slurry Bubble column Reactors (SBCR) in which a means for catalyst retention within the reactor remains an unsolved problem. This was the conclusion in a paper by B. Bhatt, et al., titled "Liquid-Phase Fischer-Tropsch Synthesis in a Bubble column," published by U.S. Department of Energy Pittsburgh Technology Center in a compilation "Liquification Contractor's Review Conference" Proceedings, Sep. 22–24, 1992. As stated in the paper "No single proven technology exists in the public domain. . ." (to retain the catalyst). The size range selected for catalyst in SBCR's depends on many factors. Some of these are: (a) manufacturing capability; (b) catalyst performance; (c) suspension requirements; and (d) reactor design and hydrodynamics. Therefore, no matter which size range is chosen, there is a need for a special device to retain the catalyst within the reactor. The liquid product must be able to flow through this device, while the gaseous and solid phases are retained in the reactor.

The B. Bhatt. et al., paper cited above reported significant daily losses of a finely-divided iron-based catalyst, despite best efforts to recover the catalyst. Another similar operation using an iron-based catalyst also led to large catalyst losses. In tests and many operations using fine particles, significant mounts are smaller then 10 microns particle diameter. The tendency of porous metal, fine-wire matts and other designs to rapidly and often permanently plug or "blind" has been encountered. These typically are based on filtering through a maze of interstices which usually are variable in size. Thus fine particles which enter the maze tend to become trapped inside the porous structure, leading to plugging of many of the passageways. Another buildup often occurs at the surface of most filters, where the deposited solids compact into a cake and progressively increase the pressure drop. A reverse surge of fluid called blowback will often reduce the cake thickness or even remove nearly all of it. However, blowback will rarely remove the majority of the particles from within the filter medium interstices. This eventually plugs the filters. Another advantage of the shaped-wire filter is the higher capacity for a given area of openings when compared to the porous-type filters. These latter, having a relatively-long tortuous pathway through the pores, create more pressure drop than the shaped-wire with a very short restricted path.

Solids loss and filter plugging are both accentuated when the solids contain a large amount of very fine materials. These fine materials may result from improper preparation of the solids to be used, or may be generated by attrition in the churning bed of solids. Attrition is minimized by (1) careful design of the bed so that spots where high velocity mixing may occur are eliminated, and (2) by use of solid particles which are hard, strong and with a smooth surface which translates to "attrition resistant." Fine materials found in the freshly prepared solids can be removed before charging to a reactor or within a reactor using a controlled stream of gas or liquid to lift or elutriate and thus remove a specific size range. Other methods such as hindered settling or classification are useful for this purpose in some cases.

Slurry Bubble Column Reactor use to produce liquid fuels from a hydrogen-carbon monoxide mixture has recently drawn a great deal of attention from a number of research facilities. Much of the work in the United States has been coordinated and supported by the U.S. Department of Energy as part of a long-range policy to increase availability of liquid fuels. Some privately-funded research and development has also been carried out, over a span of a decade or more. In each effort the retention of catalyst in the reactor has been found to be difficult or unachievable. Thus the processes are not commercially feasible until this problem is solved.

Fixed-bed Fischer-Tropsch reactors were used for liquid fuel production in Germany during World War II. Research and development has continued in several countries since then. South Africa has used their fixed=bed reactors for commercial production for more than two decades. A commercial plant has been built by Royal Dutch Shell Company in Malaysia. These large plants have established the investment and operating costs for the fixed-bed processes. Developments and preliminary engineering designs for large Bubble Column Reactor use for the Fischer-Tropsch reactions indicate that lower investment and operating costs with highly desirable products should result. Another important advantage of the Slurry Bubble Column Reactor is the greatly-improved heat removal capability and ease of temperature control when compared to the fixed-bed Fischer-Tropsch reactors.

In addition to the above advantages are the possibilities of drawing off increments of aged catalyst during long operations and of adding increments of fresh or regenerated catalyst to the slurry reactor. These are not possible during operation of a fixed-bed Fischer-Tropsch reactor.

Various attempts have been unsuccessfully made to limit filter slit widths to a precise minute dimension of about 20 microns. Korchi Arai in his U.S. Pat. No. 5,047,148 for "Retained Wire Filter Element" represents the forming of filter slits with an accuracy of one micron to one millimeter by anchoring a specially shaped wire into matching grooves in a plate. The distance between the grooves in the plate, minus the width of the top surface of the specially shaped wire would determine the filtering slit width with the accuracy claimed. Since the filtering slit width in the Arai technique is subject to the sum of at least two machining tolerances, it appears unlikely that a slit width accuracy represented by Arai can be attained.

Fritted metal and fine-wire screens have been made with openings averaging as small as a few microns. However, it has been found that such filters display wide variances in the size of the space inside the relatively deep structure of the filter medium. The result is that fine particles infiltrate and are trapped inside the structure resulting in plugging and blinding.

This invention overcomes the limitations of heretofore known processes which did not have the capability of retaining catalysts or solids of fine sizes. The process of this invention uses filter elements having filtering slits of precise minute widths in the range of 0.5 to 100 microns whereby catalysts or solids of fine sizes are retained and at the same time achieving the filtering advantages of shaped wire filtering elements. Such filters and their use in the process of this invention would enable long operating periods such as a year or more, with catalyst losses confined largely to the fines generated by attrition. The process could use a single filter or double filters with blowback provision for insurance against temporary plugging from process upsets.

SUMMARY OF THE INVENTION

The process of this invention uses two sets of filters element having filtering slit openings of between 0.5 and 100 microns to retain very fine solids mixed with a liquid in a slurry contained in a vessel which is used to carry out reactions in the slurry. Gases may also pass upward through the slurry and react. Liquids may be added to and withdrawn from the slurry, where the feed liquid may act as a heat carrier, a reactant or vehicle liquid, or all of these. The process is used in a reactor which operates at elevated temperatures and pressure, with liquid and solids residing in the reactor while a feed gas passes upward through the liquid-solid slurry and being at least partly converted to liquid; the two sets of filters being used simultaneously at least part of the time to allow some of the liquid in the reactor to pass through piping means to a separate accumulating vessel for each filter; each accumulating vessel having instruments and valves so that it can be connected to or isolated from other piping means and devices. At suitable intervals one of the accumulating systems may be closed off from the normal piping to other devices normally used and a gas or liquid at somewhat higher pressure than that extant in the reactor is introduced into the piping means connecting the corresponding filter to the closed-off accumulator, thereby causing a reverse or blowback of the material in the filter element and also removing some or all of any accumulated solids on the surface of the filter. This backward flow is maintained only briefly, followed by reconstituting the flow paths as before. The alternative filter may then be reacted in the same way.

In another embodiment of the process of this invention the reactions that occur in the reactor are normally described as Fischer-Tropsch reactions wherein gases rich in carbon monoxide and hydrogen pass upward through a slurry of a finely-divided solid catalyst and a product hydrocarbon oil made from the gas feed; usually more than half of the gasses react, and the balance of the gases exit the top of the reactor; the liquid made is continuously or intermittently drawn off to control the slurry level in the reactor while still retaining all the solid catalyst in the reactor by use of the special filter of this invention. As an example, the solid catalyst particles are preferably manufactured or separated to have diameters between 20 and 100 microns, while the slit width of the filter is established at 10 microns.

In another embodiment of the process of this invention, the reactions are carried out in a Slurry Bubble Column Reactor with both gas and liquid feeds. The liquid feed may be added at a temperature below the reaction temperature to aid in heat removal, or as a reactant, or to promote certain reactions or for other reasons. In this case higher capacity is needed for liquid removal while still not losing solids. The filter element of this invention is better suited for these conditions than the filtration-in depth devices now in use. Also the added solids carried to the filter with the higher liquid flow are more easily sloughed off the smooth surface of this invention.

The filter element used with the process of this invention preferably comprises: a plurality of generally parallel spaced elongated filter wire members each having a definite cross-sectional shape, such as a trapezoidal shape, and defining filtering slits therebetween; support means engaging the filter wire members for securing the filter wire members in place; certain of the filter wire members having on at least one side surface thereof of a plurality of spaced ridges each of a predetermined lateral dimension equivalent to the desired filtering slit opening dimension; and the filter wire members being secured in place with the ridges in engagement with at least the upper side surface of an adjacent filter wire member. In one embodiment of the filter element all of the filter wire members have a trapezoidal shape with each having spaced ridges formed on one side and the opposite side being smooth and therefore the filtering slit openings may be sized at a specific value between 0.5 and 100 microns. Another embodiment of the filter element has trapezoidal filter wire members without any ridges, separated by filter wire members of rectangular cross-sectional shape having spaced ridges formed on both side surfaces and in engagement with the upper side surfaces of adjacent trapezoidal filter wire members. The ridges may be integral with the filter wire members or may be removable. Removable ridges could also be in the form of a coating which could be dissolved in a suitable solvent after the filter element is formed with the desired filtering slit openings.

Various other advantages, details, and modifications of the present invention will become apparent as the following description of certain present preferred embodiments, preferred methods of manufacture, and preferred processes proceed.

DESCRIPTION OF THE DRAWINGS

In the accompanying drawings I show certain present preferred embodiments of my invention in which.

DESCRIPTION OF PREFERRED EMBODIMENTS

Figure 1:
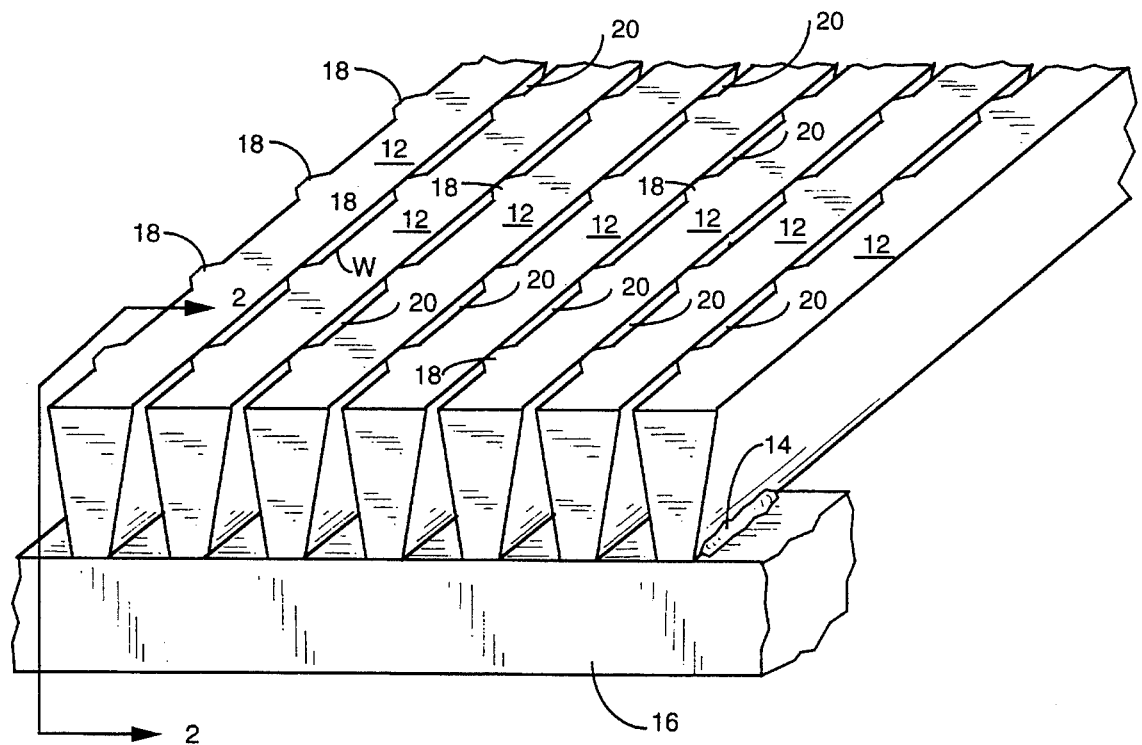
FIG. 1 is an exploded perspective view of part of a filter element which in overall shape may be cylindrical, flat, multisided, or other shapes, showing trapezoidal shaped filter wire elements.
Figure 2:
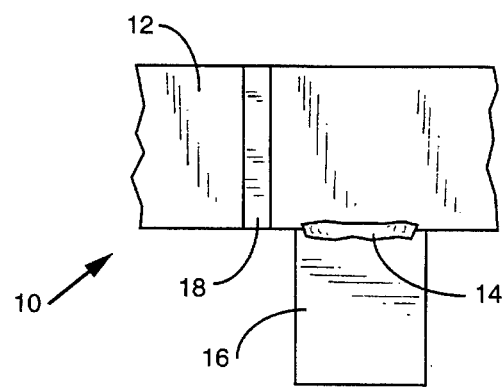
FIG. 2 is a side elevation view looking along the line 2—2 of FIG. 1 of part of one filter wire element and the support element of FIG. 1, showing the ridges extending over the entire side surface of the filter wire member.
Figure 4:
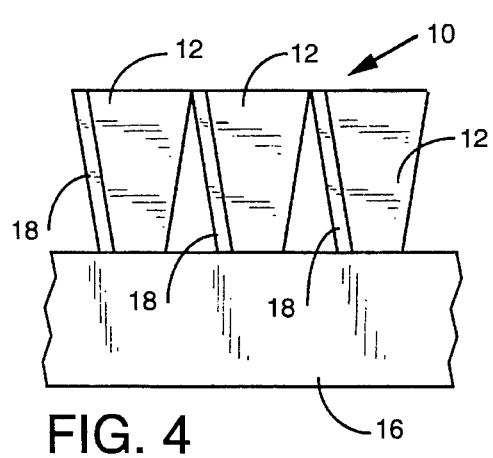
FIG. 4 is a partial front elevation view of three of the filter wire members and support element of the filter element of FIG. 1 showing the ridges in engagement with the upper surface portions of adjacent filter wire members and further showing the ridges extending over the entire side surface of the filter wire members.

The process of this invention is illustrated in FIGS. 9–12 and uses wire filter elements having precise filter slit openings of between 0.5 and 100 microns. The filter elements will be described first followed by description of embodiments of the inventive process. Referring now to the drawing FIG. 1–4 illustrate part of a wire filter element 10 which, as well known in the art, could have an overall cylindrical, flat, multi-sided, or other shape, and which is useable in various processes including the process of this invention to separate fibrous and coarse material from finer solids and liquids. Filter wire members 12 of a suitable material having a well known trapezoidal cross-sectional shape are secured as by spot welding 14 to a standard support element 16. Integrally formed on one of the side surfaces of each filter wire member 12 are a plurality of identically sized and shaped, laterally extending longitudinally shaped ridges 18. Each ridge 18 is formed with a lateral dimension the same as that of the desired filter slit opening 20 between adjacent filter wire member 12. The ridges 18 each extend along the entire side height of the filter wire members 12, and engage the upper surface portions of the adjacent filter wire members 12, to thereby serve to define the filter slit openings 20. The filter wire members 12 are secured to the support element 16 such that the upper portions of ridges 18 firmly engage the upper surface portions of adjacent filter wire members 12. The sides of the filter wire members 12 engaged by the ridges 18 are continuous, smooth, and without any ridges or the like formed on them. The ridges 18, and therefore the filter slit openings 20, are capable of being formed at precise minute lateral dimensions such as between 0.5 and 100 microns.

Figure 5:
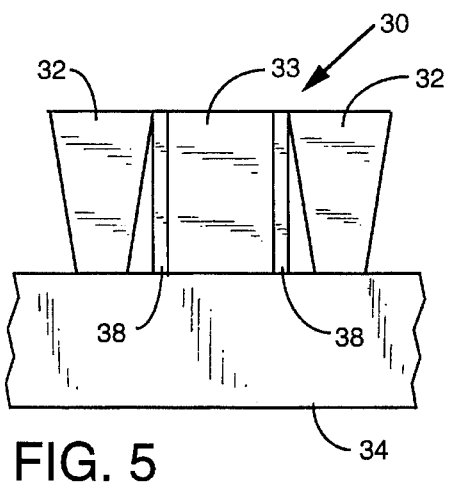
FIG. 5 is a partial front elevation view of a filter element similar to that of the filter element of FIGS. 14 showing trapezoidal shaped filter wire members separated by a rectangular shaped filter wire member having ridges formed on both side surfaces.
Figure 3:
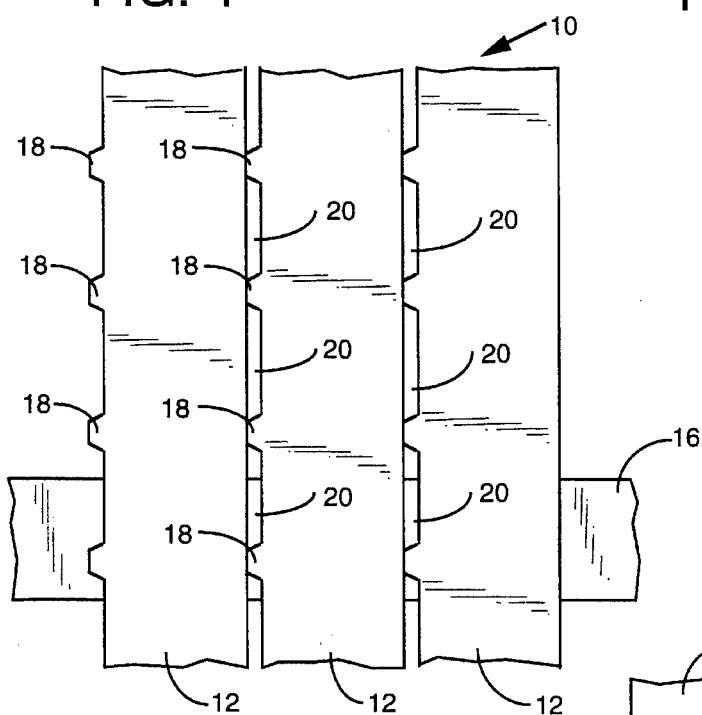
FIG. 3 is a partial plan view of the filter element of FIG. 1 showing the ridges of the filter wire members in engagement with the upper surface portions of adjacent filter wire members.
Figure 6:
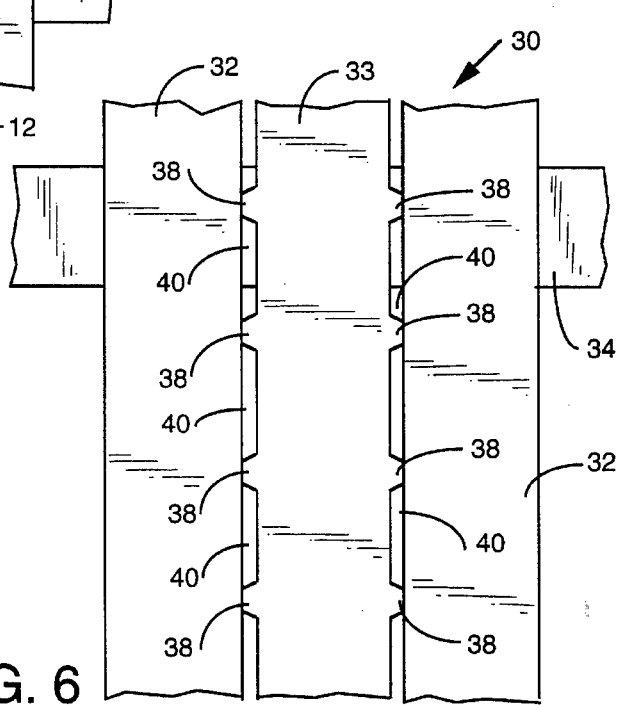
FIG. 6 is a partial plan view of the filter element of FIG. 5 showing the ridges of the rectangular filter wire member in engagement with the upper surface portions of both adjacent trapezoidal filter wire members.

FIG. 5 and 6 illustrate another embodiment of the filter element 30. Trapezoidal shaped filter wire members 32 having sides of a smooth, continuous surface are secured as by spot welding, not shown, to a standard support element 34 with rectangular cross-sectioned shaped wire elements 33 secured to the same support element 34 in between pairs of the trapezoidal wire members 32. Each side surface of the rectangular wire members 33 are provided with identically sized and shaped, laterally extending, longitudinally spaced ridges 38. As with the earlier described embodiment, the ridges 38 are formed with a lateral dimension the same as that of the desired filter slit openings 40 formed between the filter wire members 32 and 33. The upper portions of the ridges 38 firmly engage the upper surface portions of the trapezoidal wire members 32. The ridges 38 of the rectangular wire members 33 in effect define the filter slit openings 40, and are capable of being formed a precise minute lateral dimensions such as between 0.5 and 100 microns.

In both embodiments described hereinabove, the heights of the filter wire elements are substantially the same whereby the surface defined by upper portions of the respective filter wire members is essentially continuous and smooth.

Figure 7:
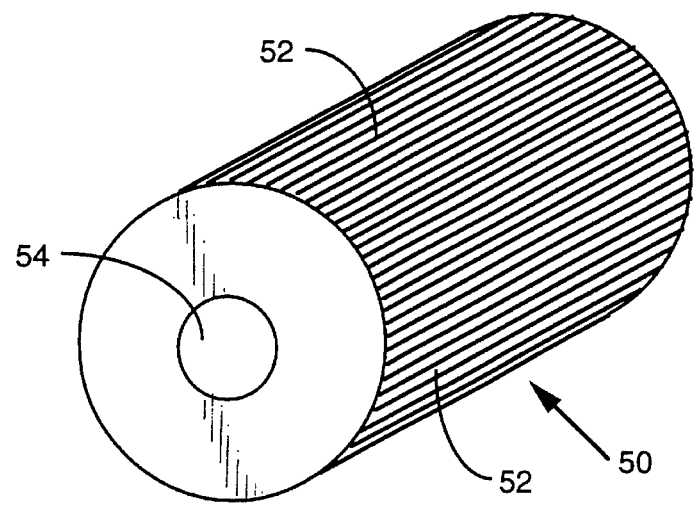
FIG. 7 is a diagrammatic representation in perspective of an embossing roller for use in shaping the filter wire members.
Figure 8:
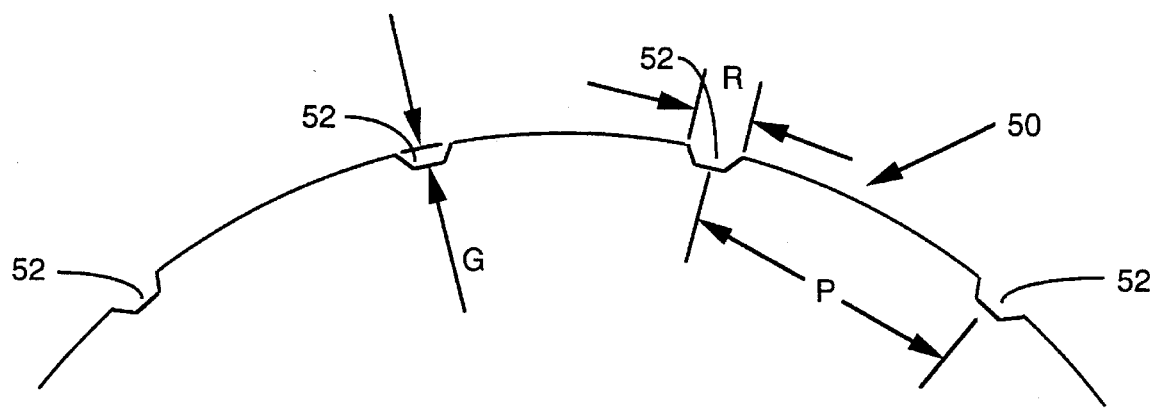
FIG. 8 is an exploded partial sectional view of one end of the embossing roller of FIG. 7.

The method of manufacture of the filter element 10 and 30 would include the steps of forming the ridges 18 and 38 on the sides of the filter wire members 12 and 33, respectively, and securing the filter wire members to the support element 16 and 34 to form the filter slit openings 20 and 40. FIGS. 7 and 8 illustrate diagrammatically a cylindrically shaped embossing roller 50 which would form the ridges 18 and 38 on the trapezoidal or rectangular filter wire members 12 and 33. The outer surface of the embossing roller 50 has formed thereon a series of precisely spaced and sized grooves 52 so to impress the desired shaped and sized ridges 18 and 38 during the rolling operation. A precisely positioned concentric cylindrical shaft or bearing opening 54 is formed as required for support during the rolling operation. The exploded sectional view of FIG. 8 illustrates the general shape of the grooves 52, with a depth G, width R, and pitch or center to center distance P. The relative width of the grooves divided by the pitch R/P may be 0.05 to 0.9 but more desirably 0.05 to 0.15. The depth G is a function of the desired filter slit opening dimension or width, which approximates the size of the particle which is expected to pass through the filter element. When the final rolling is performed to create the ridges 18 on the trapezoidal filter wire members 12 and the grooves between the ridges, the full impression of the embossing roller 50 may be made when sufficient rolling pressure is exerted. The resultant ridges 18 on filter wire member 12 would have the height G from the roller 50 minus the elastic recovery of the metal. It would be required to feed consistently annealed wire to this final rolling operation.

For the alternate use of the rectangular filter wire member 33 it would be desirable to use two identical embossing rollers 50 so that both sides of the filter wire 33 could be formed simultaneously with forces therefore balanced and both sides receiving equal impression.

Alternately when forming the final shape to filter wire members 12 and 33, any depth less than the maximum allowed by the roller groove depth G can be attained by reducing and controlling the rolling force or pressure exerted on the filter wire member 12 and 33. With this technique, a single design of embossing roller 50 may be used for a selected variety of finished filter slit opening dimensions or widths.

The quality of the surface finish and the durability of the embossing roller 50 determines the quality of the filter slit opening in the finished filter element made by the procedures just described. The roller 50 must necessarily be harder than the filter wire member to be shaped. A number of techniques and materials are available for this, including pressure molding of fritted and cemented particles, flame spraying some other hard materials, or extremely hard preformed tool steel. In any case fine grinding, lapping and polishing would be required to achieve the precision and finish needed to control the finished filter slit opening dimensions. The precision needed for production of filter with 5 microns filter slit opening width is at least + or −0.5 to 2 microns and preferably 0.05 to 0.5, which is about equivalent to + or −0.000002 to 0.00002 inch. The finish or polished surface precision needed would be a fraction of this or about 0.5 to 5.0 RMS, or about 3 to 10 millions of an inch surface roughness. Other methods of shaping filter wire members 12 and 33 may be used, such as coining, etching, laser-burning, or other obvious techniques.

For smaller filter slit opening widths such as 0.1 to 5 microns, trapezoidal or other shaped wires may be used which by nature of irregularities in their width, particularly in their edges of the surfaces to be used as the filter surface, will touch only at random intervals, with small slit openings between. Such a filter element would not have the selectivity or capacity of a filter with all slits very nearly the same size, but its cost and ease of construction might justify its use in selected applications.

An alternate to the use of formed filter wire members with integral separation ridges involves the use of a removable coating or spacing material which may be used to achieve a controlled narrow filter slit opening width. A metallic or paint-like material may be applied to one side and just the upper part of that side of a shaped wire such as filter wire member 33 of FIG. 5 and 6 that will touch next filter wire member 32 at filter surface at assembly. The applied material is then dried or treated so that it becomes hard and shrinks to the thickness desired for the filter slit opening of the finished filter element. Alternately, a metallic coating, such as aluminum, may be applied to a desired length such as spool-full of the formed wire element. This coating might be applied by electroplating or by vapor deposition, but in any case in precisely the thickness needed to achieve the desired filter slit opening width in the assembled and finished filter element. The assembly and welding occur with the applied material holding the wires apart the desired distance. Then applied material is removed by dissolving, burning, reaction with an agent, or other method.

Alternately, trapezoidal-formed filter wire member 32 as in FIGS. 5 and 6 may be wound with the upper, filter surfaces touching at the edges during the welding operation. A precision fine-grinding or lapping operation is then used to remove enough of the widest part of the trapezoid so that a slit is exposed with the desired width. This grinding or lapping operation should be performed with the motion of the wheel or belt parallel to the axis of the wire to avoid "smearing" material into the tiny slit. Alternately the slit may be created using a laser, controlled etching of the entire surface of the assembled filter element, high-intensity ultrasound vibrations which would impact the edges of the filter wire members against each other, or related methods for metal working. The shaped filter wire member 12 and the support element 16 illustrated in FIGS. 1–4 must be strong enough to withstand the anticipated maximum pressure drop across the filter element. Thus the width and particularly the height of wire elements must be chosen by the designer for each application. The lower limits of these dimension have been and will be limited by the physical limits of the machinery used to make and assemble them. The width of the filter slit openings in the finished filter element divided by the width of the shaped filter wire members determines the percent of free filtering free of filtering area through which filtrate must pass, and thus the filter capacity. The percent filtering area is further reduced by the ridges 18 in FIGS. 1–4 which determine the filter slit opening width. These relationships may be summarized as follows, along with ranges of and preferred dimension, all in microns

|  | WIRE | | GROOVE | RIDGE | | FILTRATION |
| --- | --- | --- | --- | --- | --- | --- |
|  | Width | Height | Length | Width | Length | Area, % |
| Maximum | 3200 | 6400 | 2880 | 160 | 320 | 2.5 |
| Minimum | 100 | 200 | 90 | 0.2 | 10 | 0.19 |
| Preferred examples: | | | | | | |
|  | 800 | 800 | 720 | 20 | 80 | 2.25 |
|  | 400 | 800 | 180 | 5 | 20 | 1.12 |
|  | 400 | 400 | 18 | 0.5 | 2 | 0.18 |

Figure 9:
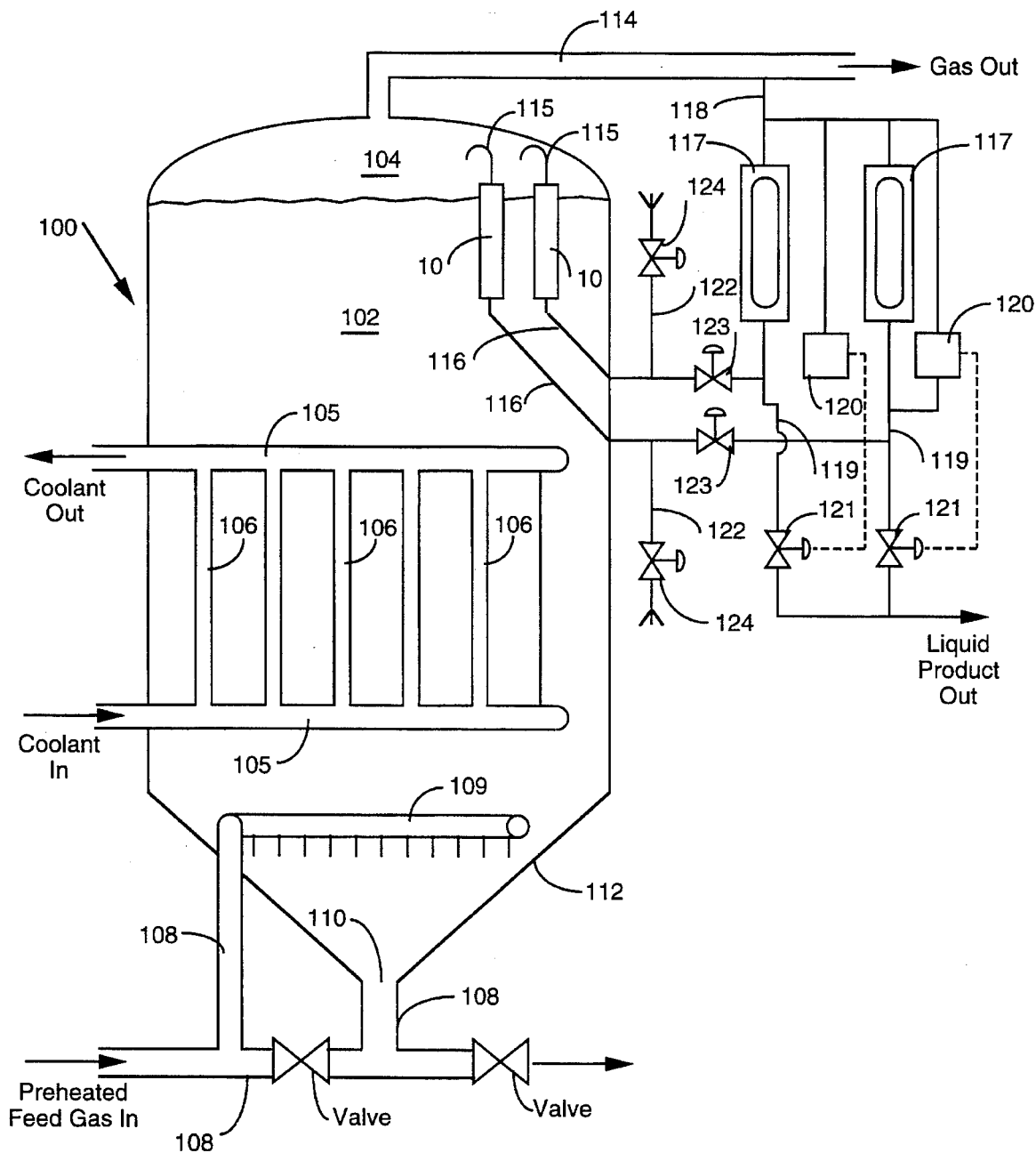
FIG. 9 is a sectional diagrammatic view, partly in schematic, of a Slurry Bubble Column Reactor vessel showing closely connected components and piping, including diagrammatic representations of the filter elements.
Figure 10:
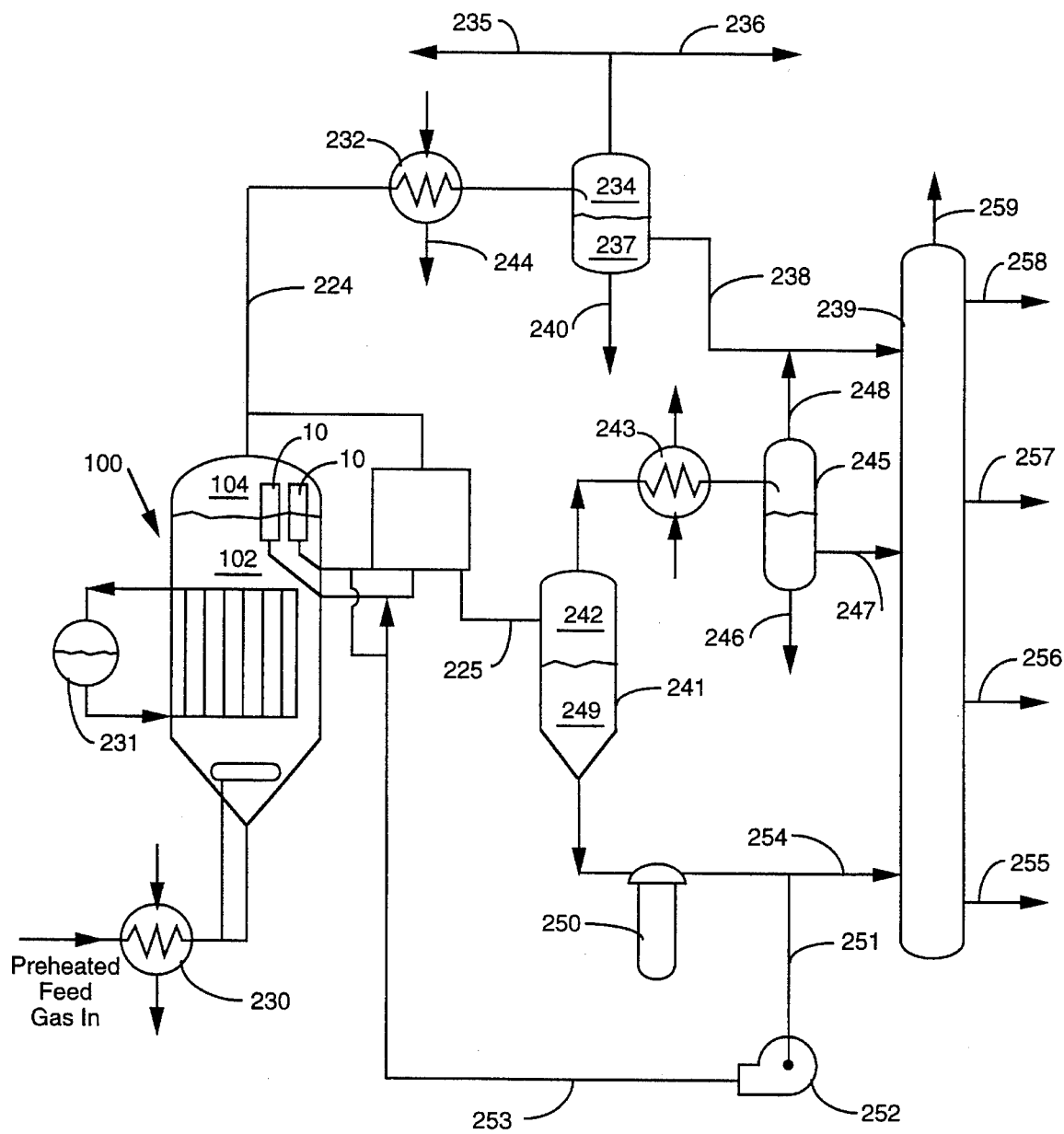
FIG. 10 is a schematic representation of the reactor vessel and components of FIG. 9 illustrating associated equipment for control, supplying some products for recycle to the reactor, and initial separation of products.

FIGS. 9 and 10 diagrammatically and schematically illustrate the process of the present invention in which filter elements 10 are used in a Slurry Bubble Column Reactor 100 which contains a liquid-finely divided slurry 102. In FIG. 9 the reactor 100 includes a disengagement space 104 above the slurry 102. An assembly of coolant tubes 106 supplied with a coolant flowing through pipes 105 is included within the reactor 100. Preheated feed gas enters the reactor 100 through pipe 108 to a distributor 109 within the reactor and through a bottom inlet 110 to a preferably conical bottom section 112 of the reactor. The gas entering the reactor 100 passes through the slurry 102 to react therewith to form predominantly liquid products with some gaseous products also being formed. The unreacted gases and gaseous products formed during the reactions with the slurry exit the top of reactor 100 through piping 114. A pair of filter elements 10 as previously described are arranged within the reactor 100. The filter elements 10 are arranged within the reactor 100. The filter elements 10 are provided with vent tubes 115 situated in the disengagement space 104 above the slurry 102. Connected with the lower end portions of the filter elements 10 are tubing 116 which pass outside the reactor to accumulators 117. The liquid products of the reaction of the gases with the slurry are continuously or at frequent intervals pass through the filter elements 10 and out of the reactor 100. The accumulators 117 are connected to gas outlet pipe 114 by tubing 118. Piping 119 is connected with the accumulators 117 for draining liquid product from the accumulators. Level controllers 120 and adjusting valves 121 are cooperatively arranged with the accumulators 117 for controlling the flow of liquid product from the accumulators 117. There is provided tubing 122 for admitting blowback gas or liquid to the drain lines 116 after control valves 123 in the drain lines 116 have been shut and blowback valves 124 have been opened.

FIG. 10 schematically represents principal vessels and other devices operatively associated with the reactor vessel 100 and its feed gas components and product stream 224 and 225. Represented are feed gas preheater 230, reactor coolant exchanger 231, reactor outlet gas cooler 232, and separator, wherein non-condensible gases 234 exit to product gas 236 and recycle gas 235, light liquid product 237 exits via pipe 238 to fractionator 239 and impure product water as stream 240. The reactor filtered liquid product 225 flashes into hot separator 241 wherein hot gases 242 flow out through cooler 243 to separator 245. Cooling air is the medium of heat removal in exchanger 232 and 243. Hot liquid product 249 flows from separator 241 through polishing filter 250, wherein traces of solids are removed, and then is partially used as reactor filter blowback as required, and the net product 254 flows to the fractionator 239. In cold separator 245 the non-condensibles 248 exit the top and enter the fractionator 239, while impure products water 246 exits from the bottom and intermediate liquid product 247 flows into fractionator 239. Fractionator 239 splits the total product mixture into specified streams 255, 256, 257, 258, and 259. One or more of these streams may be recycled to the reactor 100.

FIGS. 9 and 10 illustrate in simplified fashion principal equipment and the functions carried out in a process plant using a reaction vessel 100 to convert a feed stream into other compounds represented as streams 255 to 259. The principal contribution of the process of this invention is the use of filtering device 10 which retains a finely divided catalyst or other solid material in the fluidized or well-stirred bed 102. The bed may consist of gas bubbling up through dry solids, normally termed "fluidized", liquid flowing upward through solids, or gas bubbling upward through solid-liquid slurry, in which case the vessel is commonly termed "Slurry Bubble Column Reactor."

The Slurry Bubble Column Reactor is a preferred example of the process of this invention illustrated in FIGS. 9 and 10, where gaseous feed is convened to predominantly liquid product in bed 102, a gas phase exists above the 3-phase bed, some gases exit the top of the vessel 100 through pipe 114. The filter element 10 should be entirely submerged in bed 102, or extend somewhat above the surface of the bed as shown in FIGS. 9 and 10. Since the surface of a well-stirred 3-phase bed normally surges in a manner similar to violently boiling water, the filters may be in fact alternately submerged and partially exposed without deleterious effect. FIG. 9 indicated two filter elements 10, each of which may be multiple filter elements. These allow the liquid product to flow into the filter inner chamber forming part of the filter elements 10, then to flow out tube 116 to accumulator 117. Vent tubes 115 at the top of filters 10 and vent tubes 118 at the top of accumulators 117 permit the accumulator level to indicate and hereby permit control of the 3-phase to gas phase interface in reactor 100. FIGS. 9 and 10 indicate provision for blowback flow to the filters 10 to permit removing caked solids from the surface of the filters if this occurs. Blowback may consist of clean heavy product liquids 251 exiting polishing filter 250 pumped by pump 252 through line 253 in FIG. 10 and controlled by valve 124 in FIG. 9 to flow through pipes 122 and 116 to filter elements 10, the majority of the blowback flow exiting backward through the slits in filter elements 10 and cleansing the surface of the filter elements. Prior to the initiation of the blowback the accumulator 117 is isolated from line 116 by valve 123, and after the brief blowback, the valves are returned to position for normal flow. A dual set of filter elements 10 are indicated in FIGS. 9 and 10 so that blowback may be carried out on one set while the other set continues to operate normally. Experience with a process system may indicate that filter elements 10 may be blown back without any filter in operation for the brief interruption, since the change in level of bed 102 would be slight. Experience might also show that no blowback is normally required for a system using solid particles with non-caking tendencies, and since the smooth surface of the shaped wire filter elements tend to shed solids. However, provision for blowback for unusual operations or upsets is preferred.

The filter elements 10 used in the process of FIG. 9 and 10, would be cylindrical in shape. The vent tube 115 and the drain tubing 116 would be secured to conical end plates. The filter wire members would be formed with trapezoidal slits as previously described and are interwound around and attached to support members.

Figure 11:
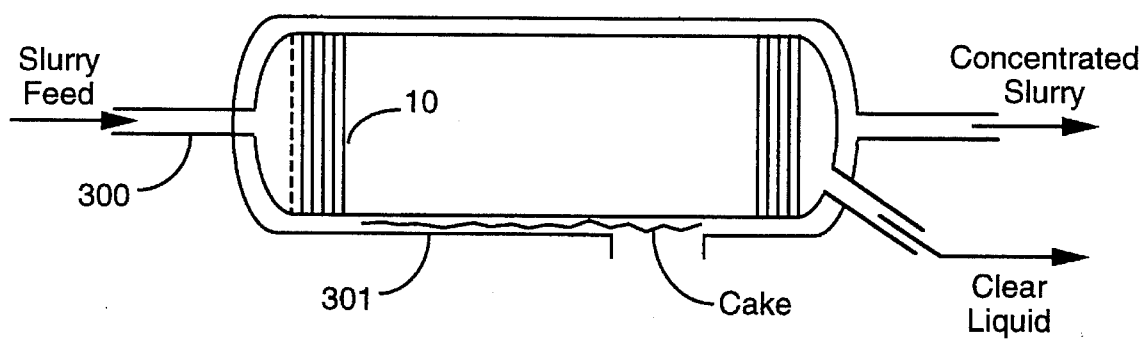
FIG. 11 is a diagrammatic representation of a vessel illustrating a process using filter elements in cross flow filtering to remove part of the liquid phase from slurries.

An alternate process of this invention using the filter element previously described is in cross-flow filtering of solids from slurries as in FIG. 11. Slurry 300 enters chamber 301 containing filter element 10 which has slits smaller than nearly all or preferably all the solid particles in the slurry. Clear or at least clarified liquid flows through the slits in the filter element 100, while most solids are retained on the surface of the filter. The annular space between the surface of filter element 106 and the inner wall of chamber 301 is small so that the velocity of the slurry flowing through this space is large. This if a solids cake deposits on filter element 109 the annular space becomes smaller, the slurry velocity becomes larger, and part of the cake is eroded or swept away to exit with the residual slurry as concentrated slurry. The advantages of the filter element for this operation lie in the reduced tendency of the diverging opening between the trapezoidal wires to clog, and especially in the smoothness of the surface which augments sloughing off of the solids.

Figure 12:
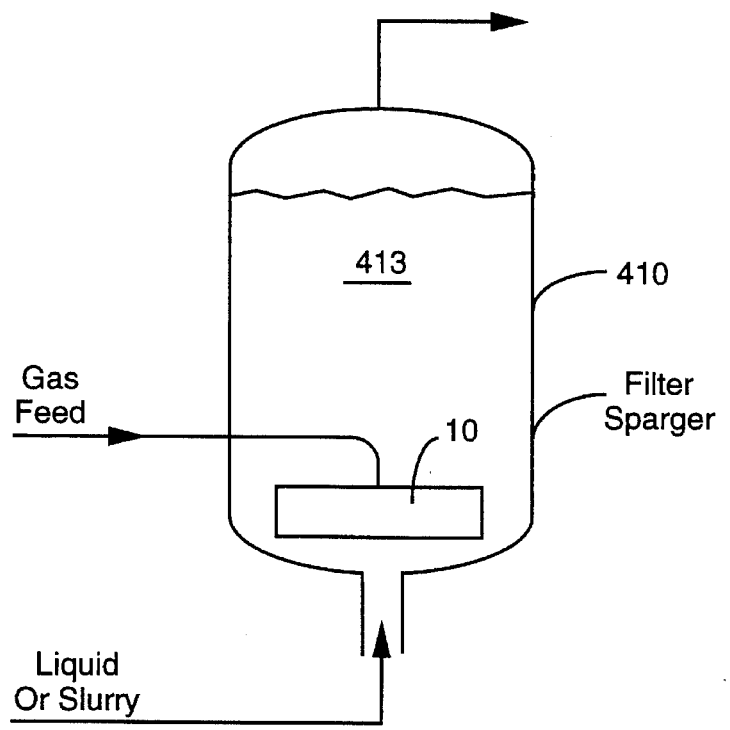
FIG. 12 is a diagrammatic and schematic representation of a process using filter elements in gas sparging or distribution into a bed containing solids.

Another use for the filter element previously described and made typically of trapezoidal-shaped wires is in gas sparging or distribution into a bed containing solids as shown in FIG. 12. Vessel 410 contains a stirred bed 413 containing solids which consists of particles larger than the slits in the filter element 10, through which filter and slits are flowing a gas which it is desired to be distributed evenly across the bed.

While I have shown and described certain present preferred embodiments of the process of this invention it is to be distinctly understood that the invention is not limited thereto, but may be otherwise embodied and practiced within the scoop of the following claims.

I claim:

1. A process for conducting a heterogeneous catalytic reaction at elevated temperatures and pressures in a slurry bubble column reactor characterized by feeding through the reactor a continuous flow of gas which is converted to primarily liquid products, said process comprising the steps of:

passing a flow of said gas upwardly in a reactor through a slurry bed of finely divided catalyst particles suspended in a liquid to react said gases to form predominantly liquid products, said slurry bed surrounding a filter device located near the top portion of said slurry bed and defining a vapor space above said top portion;

separating with said filter device said liquid products from said catalyst;

exiting from the top portion of said reactor any unreacted gas and product vapors of the reacted gas from the top of said slurry bed through said vapor space;

said filter device including in combination: generally parallel filter wire members, said filter wire members defining slits therebetween smaller in width than the diameters of substantially all of said catalyst particles, said members formed to have a precisely controlled width and shape such that said filter device retains substantially all of said catalyst particles without plugging wherein said filter device encloses a filtered liquid space; and unrestricted venting means extending from said filter wire members to said vapor space above said slurry bed;

directing said liquid products through a conduit to an accumulator having an unrestricted vent in fluid communication with said vapor space and arranged externally of said reactor; and continuously withdrawing said liquid products from said accumulator to control the level of said liquid products in said accumulator and to maintain a substantially full capacity of said liquid products inside said filter device and to also maintain a positive pressure differential between the top of said slurry bed and the filtered liquid inside said filter device.

2. The process as set forth in claim 1 wherein said passing of said liquid products through said filter wire members is at frequent predetermined intervals.

3. The process as set forth in claim 1 wherein said passing of said gas through said slurry results in reactions which are Fischer-Tropsch synthesis.

4. The process as set forth in claim 1 including the step of preparing said finely divided catalyst particles prior to said passing of said gas such that particles finer than the size desired are removed prior to use within said reactor.

5. The process as set forth in claim 4 wherein said preparing of said finely divided catalyst particles is such that the particles of the catalyst used within said reactor are attrition resistant.

6. The process as set forth in claim 1 including the step of adding liquid feed to said reactor, said liquid feed being either the recycle of a product stream or any liquid feed useful for promoting the function of said reactor.

7. The process as set forth in claim 1 including the step of recycling into said reactor a portion of selected components of a gaseous product stream.

8. The process as set forth in claim 1 wherein the particle diameter of said finely divided catalyst particles is between 5 and 100 microns.

9. The process as set forth in claim 1 wherein the particle diameter of said finely divided catalyst particles is between about 1 and 1000 microns.

10. The process as set forth in claim 1 including the step of removing from said finely divided catalyst particles smaller in size than said slit of said filter wire members, said separating being conducted prior to use of said finely divided catalyst particles in said reactor whereby the lateral dimensions of said slits are less than the particle diameter of the smallest significant fractions of said finely divided catalyst particles in said reactor.

11. The process as set forth in claim 1 wherein each of said filter wire members has a generally trapezoidal cross-sectional shape; and said filter wire members having ridges on one side thereof and the opposite side being without ridges.

12. The process as set forth in claim 11 wherein said lateral dimension of at least the upper portion of each of said ridges and each of said slits are between about 0.5 and 100 microns.

13. The process as set forth in claim 11 wherein said ridges are integrally formed with said filter wire members.

14. The process as set forth in claim 11 wherein said ridges extend along the entire side of said filter wire members.

15. The process as set forth in claim 11 wherein the heights of said filter wire members are substantially equal whereby said filter wire members define a substantially smooth upper surface.

16. The process as set forth in claim 11 wherein said ridges are selectively removable from said filter wire members whereby after said filter wire members are secured in place and said slits defined by said ridges may be removed leaving said slits as originally formed.

17. The process as set forth in claim 1 including a plurality of said filter wire members each having a generally trapezoidal cross-sectional shape without any ridges thereon; and including a plurality of said filter wire members having a generally rectangular cross-sectional shape with said ridges being formed on each side thereof; and each pair of said trapezoidal shaped filter wire members being separated by a rectangular shaped filter wire member.

18. The process as set forth in claim 17 wherein said ridges are selectively removable from said rectangular shaped filter wire elements whereby after said filter wire members are secured in place and said slits are defined by said ridges and said ridges may be removed leaving said slits as originally formed.

* * * * *